(12) United States Patent
Barrett et al.

(10) Patent No.: US 7,536,514 B2
(45) Date of Patent: May 19, 2009

(54) EARLY RETURN INDICATION FOR READ EXCLUSIVE REQUESTS IN SHARED MEMORY ARCHITECTURE

(75) Inventors: Wayne Melvin Barrett, Rochester, MN (US); Kenneth Michael Valk, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 11/225,655

(22) Filed: Sep. 13, 2005

(65) Prior Publication Data

US 2007/0061519 A1     Mar. 15, 2007

(51) Int. Cl.
*G06F 12/06* (2006.01)
(52) U.S. Cl. ..................... 711/141; 710/100
(58) Field of Classification Search ................. 711/141, 711/148, 149, 154, 156; 710/100, 300
See application file for complete search history.

(56) References Cited

U.S. PATENT DOCUMENTS

| | | | |
|---|---|---|---|
| 6,463,510 B1 | 10/2002 | Jones et al. | |
| 6,631,448 B2 | 10/2003 | Weber | |
| 6,738,836 B1 * | 5/2004 | Kessler et al. ................. | 710/22 |
| 7,216,205 B2 | 5/2007 | Greer et al. | |

OTHER PUBLICATIONS

Azimi, M , et al., "Scalability Port: A Coherent Interface for Shared Memory Multiprocessors", High Performance Interconnects IEEE, (Aug. 21, 2002), pp. 65-70.*
Lilja, DJ, "Cache Coherence in Large Scale Shared Memory Multiprocessors: Issues and Comparisions", ACM Computing Surveys, (Sep. 2003), pp. 303-338.*
Ender, Bilir E., et al., "Multicast Snooping: A New Coherence Method Using A Multicast Address Network", Computer Architecture News, (May 1999), pp. 294-304.*
Tracey et al., A Hardware Description Language for Processor Based Digital Systems, 1982, IEEE 19th Design Automation Conference, pp. 330-337.

* cited by examiner

*Primary Examiner*—Pierre-Michel Bataille
(74) *Attorney, Agent, or Firm*—Wood Herron & Evans LLP (57) ABSTRACT

An early return indication is used to notify a first communications interface, prior to a response being received from any of a plurality of sources coupled to a second communications interface, that the return data can be used by the first communications interface when it is received thereby from a source of the return data if the source has an exclusive copy of the return data. By doing so, the first communications interface can often prepare for forwarding the return data over its associated communication link such that the data can be forwarded with little or no latency once the data is retrieved from its source, and may be able to initiate the return of data over the communication link prior to all responses being received from the other sources. The early return indication may also serves as an early coherency indication in that the first communications interface is no longer required to wait for updating of a coherency directory to complete prior to forwarding the return data over the communication link.

8 Claims, 6 Drawing Sheets

EARLY RETURN INDICATION FOR READ EXCLUSIVE REQUESTS IN SHARED MEMORY ARCHITECTURE

CROSS-REFERENCE TO RELATED APPLICATIONS

This application is related to copending U.S. patent application Ser. No. 11/225,656, filed on even date herewith by Brian T. Vanderpool and entitled "EARLY RETURN INDICATION FOR RETURN DATA PRIOR TO RECEIVING ALL RESPONSES IN SHARED MEMORY ARCHITECTURE," (ROC920050142US1), the disclosure of which is incorporated by reference herein.

FIELD OF THE INVENTION

The invention relates to computers and data processing systems, and in particular to communicating data in a data processing system incorporating a shared memory architecture.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple processors to provide increased workload capacity. Furthermore, some processors have been developed that support the ability to execute multiple threads in parallel, effectively providing many of the same performance gains attainable through the use of multiple processors.

A significant bottleneck that can occur in a multi-processor computer, however, is associated with the transfer of data to and from each processor, often referred to as communication cost. Many computers rely on a main memory that serves as the principal working storage for the computer. Retrieving data from a main memory, and storing data back into a main memory, however, is often required to be performed at a significantly slower rate than the rate at which data is transferred internally within a processor. Often, intermediate buffers known as caches are utilized to temporarily store data from a main memory when that data is being used by a processor. These caches are often smaller in size, but significantly faster, than the main memory. Caches often take advantage of the temporal and spatial locality of data, and as a result, often significantly reduce the number of comparatively-slower main memory accesses occurring in a computer and decrease the overall communication cost experienced by the computer.

Often, all of the processors in a computer will share the same main memory, an architecture that is often referred to as Symmetric Multiprocessing (SMP). One limitation of such computers, however, occurs as a result of the typical requirement that all communications between the processors and the main memory occur over a common bus or interconnect. As the number of processors in a computer increases, the communication traffic to the main memory becomes a bottleneck on system performance, irrespective of the use of intermediate caches.

To address this potential bottleneck, a number of computer designs rely on another shared memory architecture referred to as Non-Uniform Memory Access (NUMA), whereby multiple main memories are essentially distributed across a computer and physically grouped with sets of processors and caches into physical subsystems or modules, also referred to herein as "nodes". The processors, caches and memory in each node of a NUMA computer are typically mounted to the same circuit board or card to provide relatively high speed interaction between all of the components that are "local" to a node. Often, a "chipset" including one or more integrated circuit chips, is used to manage data communications between the processors and the various components in the memory architecture. The nodes are also coupled to one another over a network such as a system bus or a collection of point-to-point interconnects, thereby permitting processors in one node to access data stored in another node, thus effectively extending the overall capacity of the computer. Memory access, however, is referred to as "non-uniform" since the access time for data stored in a local memory (i.e., a memory resident in the same node as a processor) is often significantly shorter than for data stored in a remote memory (i.e., a memory resident in another node).

Irrespective of the type of architecture used, however, the latency of memory accesses is often a significant factor in the overall performance of a computer. As a result, significant efforts have been directed to obtaining the smallest memory latency possible for any given memory request.

In a computer where processors are coupled to a memory system via an intermediate chipset, read or load requests typically must be forwarded to the chipset via a processor bus that interconnects the requesting processor to the chipset, which then determines where the requested data currently resides (e.g., in main memory, in a shared cache, in the local cache of another processor, or, in the case of a NUMA system, in a memory or cache in a different node). The determination is often made by performing a lookup of a coherency directory, which may be centralized, or in some designs, distributed to multiple points in the architecture. In addition, an update to the coherency directory may also be made based upon the fact that the requested data will be resident in the requesting processor after completion of the request.

Based upon the location of the requested data, the chipset will then initiate the retrieval of the requested data, and once the data is returned, the data is typically stored in a buffer in the chipset. Thereafter, a communications interface in the chipset, e.g., the processor bus interface that couples to the requesting processor over the processor bus, will use the return data by retrieving the data from the central buffer and driving the return data to the requesting processor over the processor bus. The latency of the request is typically measured from the time that the request is forwarded across a processor bus by a requesting processor, until the return data is driven back across the processor bus to the requesting processor.

One operation that can affect the latency of a memory request in conventional designs is associated with updating the coherency directory. Specifically, in many designs, the data returned from a memory or other source, and temporarily stored in a chipset buffer, is not forwarded to the requesting processor by the processor bus interface until after the coherency directory is updated to reflect the new status of the relevant data. This is typically due to the need to verify that the memory request will not need to be canceled prior to returning the data to the requesting processor. In many such designs, therefore, the data being returned waits in the chipset buffer until a confirmation is received from the coherency directory indicating that the data is ready to be forwarded to the requesting processor.

In a multinode system such as a NUMA-based system, a similar issue arises with respect to communicating data requested by another node over the communication link between the nodes. Some conventional designs, for example, utilize scalability port interfaces in a chipset to provide high speed point-to-point interconnections between pairs of nodes. From the perspective of the chipset in a node, the handling of memory requests received over a scalability port is handled much like a memory request from a local processor, with the primary difference being that the communications protocol used on the scalability port is often packet-based, and requires that data be formatted into specific packets of information prior to being sent to another node via the scalability port. From the perspective of performing a lookup of a coherency directory to identify the source of the requested data, updating the coherency directory, retrieving the requested data from the source, storing the return data in a buffer, and waiting for confirmation from a coherency directory, there is little difference between memory requests originated by local processors and those originated by remote nodes.

By requiring the data requested by a processor or another node in a multinode system to wait in the buffer, several cycles of additional latency may be introduced. Furthermore, given the pipelined nature of most memory systems, this requirement typically requires larger buffers to enable the data for multiple requests to be retained in the chipset while awaiting confirmation from the coherency directory. Larger buffers often lead to increased cost and complexity for a given design, and as such, it is typically desirable to minimize the amount of buffering required in a chipset whenever possible.

NUMA-based systems may also be subject to additional latencies associated with processing responses from other nodes whenever data requested by a processor in one node will be sourced by another node via the scalability port. In particular, in many designs a coherency directory on a node will be able to determine that requested data will be sourced by another node, although which particular node will source the data is typically not known. As a result, many such systems utilize a broadcast protocol to forward the request to all other nodes in the system. Then, once each node receives the request, the node determines whether that node should return the requested data. If so, the node returns the data in a response, along with an indication of the state of the data, e.g., whether the node has a shared or exclusive copy of the data. If not, the node still sends a non-data response to confirm that the node received the response, which also may also indicate that the node does not have a valid copy of the data. The node that broadcasts the request typically waits to receive responses from all of the nodes before updating the coherency directory and allowing the return data to be forwarded to the requested processor on the node.

In some designs, a directory protocol may be used in lieu of a broadcast protocol. With a directory protocol, a request is sent to a central directory in the system, which looks up the current node for the requested data and sends a request to that node. The node that receives the request then forwards the requested data back to the original requesting node, and notifies the central directory to indicate a transfer in ownership of the data to the requesting node (if appropriate).

While directory protocols often scale better, broadcast protocols are often preferred for performance reasons, particularly in smaller systems. One drawback of many broadcast protocols, however, results for the need to wait for all responses to a request before allowing a processor on a node to use return data received from another node in the system. In particular, in some circumstances, the requested data may be returned in a response from one node before the responses from other nodes have been received. As a result, even once the requested data is received from another node, several cycles may elapse before all responses are received from the other nodes and the data is forwarded to the requesting processor. Consequently, the return data, which has already been received by the node, may need to be stored in a buffer and held for several cycles.

Therefore, a significant need continues to exist for a manner of minimizing the latency of memory requests in a shared memory data processing system.

SUMMARY OF THE INVENTION

The invention addresses these and other problems associated with the prior art by utilizing early return indication to notify a first communications interface, prior to a response being received from any of a plurality of sources coupled to a second communications interface, that the return data can be used by the first communications interface when it is received thereby from a source of the return data if the source has an exclusive copy of the return data. By doing so, the first communications interface can often prepare for forwarding the return data over its associated communication link such that the data can be forwarded with little or no latency once the data is retrieved from its source, and may be able to initiate the return of data over the communication link prior to all responses being received from the other sources. In addition, in many embodiments the early return indication also serves as an early coherency indication in that the first communications interface is no longer required to wait for updating of a coherency directory to complete prior to forwarding the return data over the communication link.

In some embodiments consistent with the invention, the early return indication is utilized in connection with data that is being returned by another node in a multinode data processing system, and where the node that has requested the data is executing a read exclusive request that seeks to modify the requested data, e.g., a Bus Read Invalidate Line (BRIL) request in a scalability network. Typically, a BRIL request requires a guarantee that all other copies of requested data have been invalidated before the data can be used by the requesting node. Otherwise, a risk exists that another node may attempt to use a stale copy of the data. However, in the case of data that is held by another node in an exclusive state, it is known that no other node will have a valid copy of the requested data, so whenever a response is received from that node, it is safe for the data to be used in the receiving node prior to receiving all responses from the other nodes in the system.

Therefore, consistent with the invention, a request for data is processed in a data processing system of the type including a first communications interface configured to be coupled to at least one requester over a first communications link and a second communications interface configured to be coupled to a plurality of sources over a second communications link. In response to a request by the requester, the request is forwarded to the plurality of sources over the second communications interface, and responses to the request from each of the plurality of sources are tracked. Furthermore, prior to receiving a response from any of the plurality of sources, an indication is made to the first communications interface that return data received from one of the sources in response to the request can be used by the processor bus interface if the source has an exclusive copy of the return data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter utilize early return indication to enable one communications interface to anticipate a data return from a source over another communications interface, and based upon that anticipation, prepare for communication of the return data, e.g., by planning out and executing any bus arbitration/signaling, preparing a data response packet, etc. Then, once the data is returned from its source over the other interface, the communications interface can communicate the data directly to the entity that requested the data with minimal latency and with a minimal amount of buffering.

Embodiments consistent with the invention, in particular, accelerate the return of data over a first communications interface to a requester that has issued a request for that data whenever it is determined that the return data will be returned by a source among a plurality of sources that are accessed via a second communications interface, and that the data can safely be used by the first communications interface once it is returned by that source. Embodiments consistent with the invention additionally incorporate a coherency protocol whereby the request from the requester is forwarded to the plurality of sources over the second communications interface, and responses from those sources are then tracked to confirm that all of the sources have received the request. Locally, each source updates its own coherency information to ensure that the state of the requested data is coherent throughout the system. One or more of the sources also provide the return data in response to the request, e.g., as part of the responses, and in certain circumstances in which it can be verified that the return data is safe to use prior to responses being received from all sources, that return data is provided to the first communications interface for forwarding to the requester before all of the responses are received, and thus with reduced latency and decreased buffering requirements.

Embodiments consistent with the invention generally reduce latency and buffering requirements through a number of related mechanisms. First, in appropriate situations, the collection of responses to a memory request is removed from the critical path for the processing of the memory request such that data returned in connection with one of the responses may potentially be used prior to all responses being received. As such, any latency caused by tracking and/or collecting responses after the requested data is received will typically not affect the latency of a memory request.

Second, an early indication, referred to herein as an early return indication, is provided to the first communications interface, indicating that the data can be used by the first communications interface and forwarded over its associated communications link, whenever the data is received by the communications interface from the source of the return data over the second communications interface. The indication is typically provided prior to receiving responses from any of the sources, although the indication may be provided before, after or concurrently with forwarding the request to the sources. In addition, the indication may indicate that the data will arrive at a predetermined time, e.g., in a fixed number of cycles. By doing so, this allows the first communications interface to begin arbitrating for the bus and line up the data return phase, and/or preparing a data response packet or otherwise beginning formatting the data for communication over the communications link, prior to the data actually being made available to the first communications interface.

The early return indication is asserted whenever it can be ascertained that return data can safely be used without the need for receiving responses from all of the sources. For example, in one implementation of the invention, it can be ascertained that return data can safely be used prior to receiving all responses whenever the request is of the type that will not have the ability to modify the requested data, e.g., in the case of a load or read request. In such a case, even if other sources have copies of the return data, it is typically safe to use the return data since those other copies will be in a shared state once the request has been processed locally by each of the sources.

In another implementation of the invention, it can be ascertained that return data can safely be used prior to receiving all responses whenever the request is of the type that will have the ability to modify the requested data, e.g., in the case of a read exclusive or read with intent to modify request, and when it can be determined that the source of the return data held an exclusive copy of the data. In many embodiments, not all read exclusive-type requests can be safely used prior to receiving all responses due to the need to verify that all other sources have invalidated their own copies of the data before allowing the requester to have an exclusive copy of the data. However, it has been found that, in the event that a source that is providing return data in response to a request previously had an exclusive copy of the data, it can be confirmed that no other source had a copy of the data, so there is no risk that another source will attempt to use a stale copy of the data.

As will become more apparent below, it may be desirable to provide early return indications in connection with both types of situations. However, it may be desirable in some embodiments to omit one type of early return indication.

It will also be appreciated that, in many embodiments consistent with the invention, the update of a coherency directory may be treated as a separate step from performing a lookup of the coherency directory, and may also be removed from the critical path for the processing of the memory request. In this regard, the early return indication may further serve as an early coherence indication that indicates that the return data may be used prior to updating the coherency directory. By doing so, the update to the coherency directory is essentially made independent of enabling the communications interface to communicate the return data over the communications link based upon a lookup of the coherency directory. As such, any latency caused by updating the coherency directory will typically not affect the latency of a memory request. A further discussion of this concept is provided in copending U.S. patent application Ser. No. 11/023,706, filed on Dec. 28, 2004 by Barrett et al. and entitled "EARLY COHERENCY INDICATION FOR RETURN DATA IN SHARED MEMORY ARCHITECTURE," which application is incorporated by reference herein. It will be appreciated, however, that in some embodiments early coherence indication may not be utilized in connection with early return indication as discussed herein. Furthermore, early coherence indication may be utilized in connection with handling different types of requests, e.g., requests originated from other nodes via the scalability port interface, processor requests that are sourced by another processor on the same node or by the local memory of the node, etc.

Embodiments consistent with the invention are principally focused upon providing an early return indication to one communications interface to enable that communications interface to prepare for data returned over a different communications interface. In the illustrated embodiments, for example, the early return indication is provided to a processor bus interface to enable that interface to prepare for sending return data to a requesting processor on the processor bus, when that return data is being sourced by a different node in a multinode data processing system over a scalability port interface. Furthermore, in the illustrated embodiments, the early return indication is generated in connection with forwarding a request to other nodes in a scalability network in response to a processor request, whenever a coherency directory on the local node for the processor determines that the return data will be sourced by a different node.

The illustrated embodiments rely on a broadcast protocol that propagates the request to each other node of the system, and that requires confirmation or acknowledgment, in the form of a response, to be returned by each other node in the system to ensure that all nodes have processed the request in a suitable manner, e.g., by locally updating their coherency information for the data to maintain coherency throughout the system. In other embodiments, a directory-based protocol or other coherency protocol may be used. Furthermore, it will be appreciated that by "forwarding" a request from a processor to other nodes, the request forwarded to the other nodes need not have the same format as the request from the processor, and indeed may require reformatting to comply with the protocol utilized by the other nodes or sources to which the node is connected. In addition, the forwarding of a request may result in the generation of multiple requests, e.g., requests directed to each other node in the system.

Typically, only one node, or source, returns data in response to a request, by virtue of a serializer mechanism that ensures that even in the case of data that is shared by multiple nodes, only one node will return the data in response to a request. Such a serializer mechanism may be implemented, for example, by defining additional cache states that distinguish between a node having a shared copy of data and a node having a shared copy of data and additionally being the owner of the data. For example, it may be desirable to define, for shared data, four states: shared clean, shared dirty, shared serializer clean and shared serializer dirty. From these states, each node can locally determine whether it should return data in response to a request. It will be appreciated, however, that in other embodiments, every node that has a copy of shared data will return the data in response to the request, with the node receiving the multiple responses responsible for ensuring that the appropriate copy of the data is returned (e.g., by returning the first copy of shared data that is returned).

As noted above, the invention contemplates the provision of an indication to a first communications interface that data being returned over a second communications interface can be used by the first communications interface once that data is received thereby. In the illustrated embodiments, for example, the first communications interface is a processor bus interface for a node in a multinode data processing system, while the second communications interface is an internodal interface such as a scalability port interface that receives return data from another node in the system. However, it will be appreciated that either communications interface consistent with the invention may include practically any logic suitable for communicating data to be returned in response to a memory request to the desired destination for that memory request, be it a processor bus interface, an internodal interface, or any other suitable communications interface known in the art.

A source of return data may include any memory storage or component housing the same that is capable of storing data and returning that data in response to a memory request. For example, in the multinode implementation described hereinafter, the source of return data may include the main memory storage for a particular node, any cache memory maintained within or managed by a chipset in that node, and any processor (or local cache therefor) that is resident in the node, as well as any of such components that may be resident on a different node altogether. Moreover, from the perspective of return data being returned to one node by another node, from the perspective of the requesting node, the source may simply be the node that returns the data, regardless of where in that node the data was actually sourced.

In the embodiments discussed hereinafter, an early return indication is also referred to as an early coherency indication, given that the indication serves the additional purpose of indicating that data can be used prior to update of a coherency directory. It will be appreciated, however, that in other embodiments, an early return indication may not provide any such indication with respect to coherency. In addition, other factors may be relevant in an early coherency indication from the perspective of determining whether return data can be used by a communications interface, e.g., when it can be ascertained that the request will complete. For example, in a multinode system, a request may not complete if it is determined that another request in process is directed to the same address or cache line (i.e., a collision with another request).

It will also be appreciated that multiple indicators may be utilized by a communications interface to determine when return data may be used by the communications interface. For example, in the embodiments discussed below, separate coherency indications are used for read and read exclusive requests, with an additional useSPdata indication that is used to indicate when shared data can be used in response to a read exclusive request. Other modifications will be apparent to one of ordinary skill in the art having the benefit of the instant disclosure.

Turning now to the Drawings, wherein like numbers denote like parts throughout the several views, FIGS. 1-4 highlight the distinctions in the handling of exemplary memory requests issued by a processor in the chipsets of a conventional data processing system (FIG. 1) and a data processing system implementing early return indication consistent with the invention (FIGS. 2-4), where it is assumed that the memory request will be fulfilled from a remote node in a multinode data processing system. It will be appreciated that the timings of the various operations illustrated in FIGS. 1-4 are relative in nature, and that no specific timings should be implied by the specific positions of the blocks in either figure. It is also assumed that the requester is a processor coupled to a chipset via a processor bus, and that the other nodes in the data processing system are coupled to the chipset via a scalability port interface.

Figure 1:
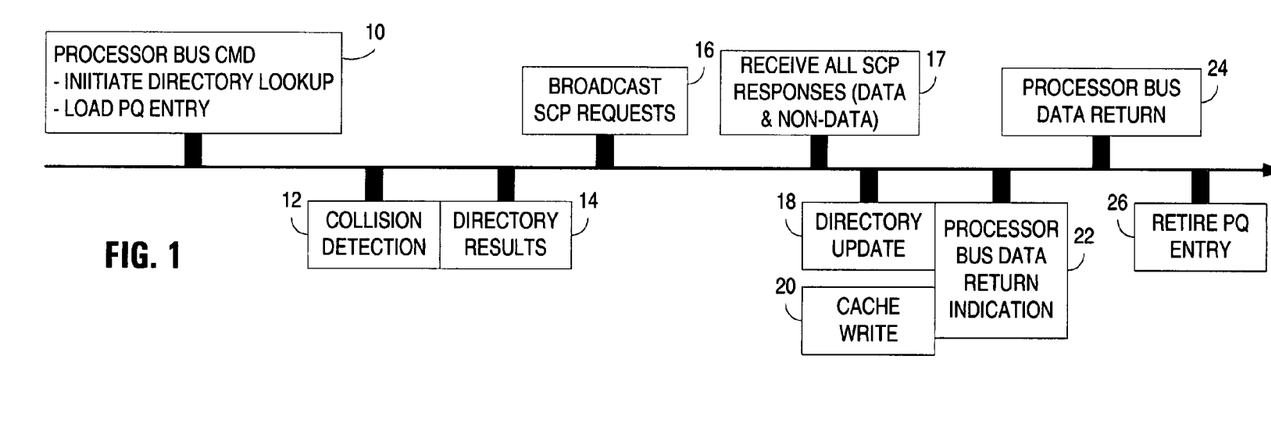
FIG. 1 is a functional timing diagram illustrating the relative timings of various steps in a conventional memory transaction in a multinode data processing system implementing a shared memory.

As shown in block 10 of FIG. 1, a processor request, issued as a processor bus command, is received by a conventional chipset, resulting in the initiation of a directory lookup, as well as the loading of a pending queue (PQ) entry, which is used to track the progress of the command throughout its lifespan. In addition, in some embodiments, the request may be speculative in nature, and result in the issuing of a memory request to the memory on the node. Some period of time later, the result of a collision detection operation is returned as illustrated in block 12, as is the result of a coherency directory lookup, as illustrated in block 14. As a result of this lookup, it is determined that the source of the requested data is another node, and as such, scalability port (SCP) requests are broadcast to the other nodes in the system.

Next, as shown in block 17, some time later all of the responses to the SCP requests are received. One of these responses will be a data response, which includes the data requested by the processor. The other responses are typically non-data responses, or null responses, which do not provide data, but which do provide confirmation of the receipt of the request by each node.

Thereafter, the coherency directory is updated, and if necessary, the data is written to a cache in the chipset, as illustrated in blocks 18 and 20. In the conventional design, once the coherency directory is updated, a processor bus data return indication is made to the processor bus interface as illustrated in block 22, and some time thereafter, e.g., after the processor bus interface prepares the return data and arbitrates for the processor bus, the processor bus interface initiates the transfer of the return data over the processor bus, as illustrated in block 24. Once the return data is transferred over the processor bus, the PQ entry for the command can be retired, as illustrated in block 26, and processing of the command is complete.

In contrast, embodiments consistent with the invention provide an early return indication to the processor bus interface that the return data can be used by the communications interface and forwarded over its associated communications link when the data becomes available, and prior to receiving all responses from the other nodes in the data processing system. In the illustrated embodiments, this early return indication also serves as an early coherency indication, as the indication is made before the coherence directory is updated.

Figure 2:
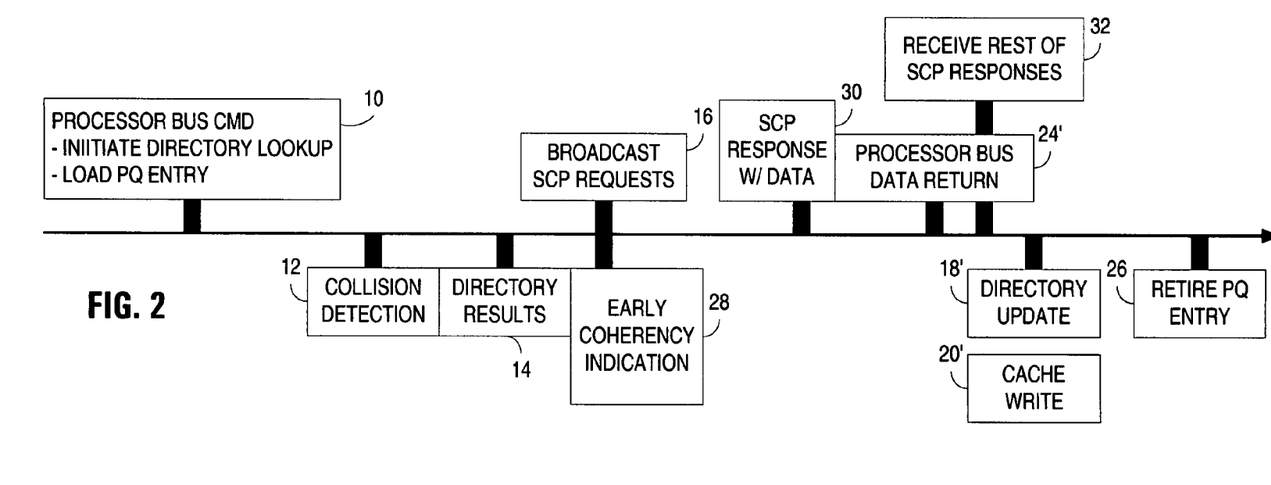
FIG. 2 is a functional timing diagram illustrating the relative timings of various steps in a read memory transaction in a multinode data processing system implementing a shared memory and utilizing early return indication in a manner consistent with the invention.

FIG. 2, for example, illustrates the handling of a read request such as a BRL request, for which the return data is found to be located on a remote node. In this embodiment, early coherence indication may be implemented by providing an early coherency indication as illustrated in block 28, which occurs after the results of collision detection and lookup of the coherency directory have been returned, but also prior to updating the coherency directory, and optionally writing to the chipset cache, as illustrated in blocks 18' and 20'. Of note, this early coherency indication is also performed concurrently to the broadcast of SCP requests to the remote nodes in block 16, although it will be appreciated that the indication may alternatively be made before or after the broadcast of the SCP requests, so long as the indication is made prior to receiving any responses from the remote nodes. Thereafter, responses are received from the other nodes, including an SCP response with the requested data, which is shown at block 30, until all responses are received as indicated in block 32. It will be appreciated that the receipt of the data response in block 30 may occur in any sequence relative to the non-data responses from the other nodes.

By providing the early indication to the processor bus interface, the processor bus interface is able to begin arbitrating for the processor bus and otherwise preparing for the return of data, such that once the data is returned from the remote node, the data may be returned over the processor bus at a much earlier time, as represented by block 24'. In many instances, the data may even be returned prior to receiving responses from all of the nodes (block 32).

Moreover, given the updating of the coherency directory is also outside of the critical path for processing the memory request, the updating of the directory, and optional writing to the chipset cache, may be delayed if desired, as illustrated in blocks 18' and 20'. Consequently, it can be seen that the overall latency of the request, from when it is first placed on the processor bus until the return data is returned back over the processor bus, is reduced from that of conventional designs.

Figure 3:
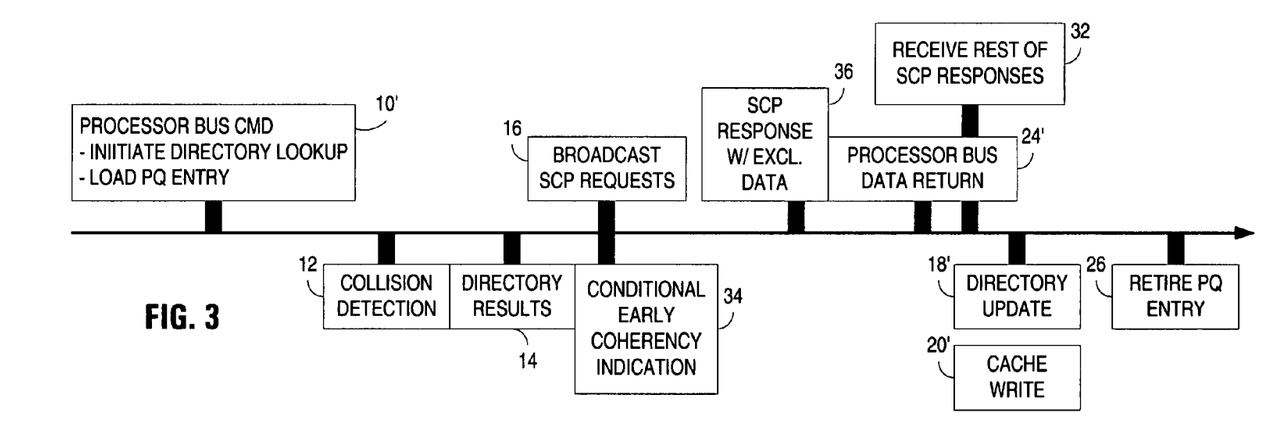
FIG. 3 is a functional timing diagram illustrating the relative timings of various steps in a read exclusive memory transaction in a multinode data processing system implementing a shared memory and utilizing early return indication in a manner consistent with the invention, where the data requested by the read exclusive memory transaction is in an exclusive state.
Figure 4:
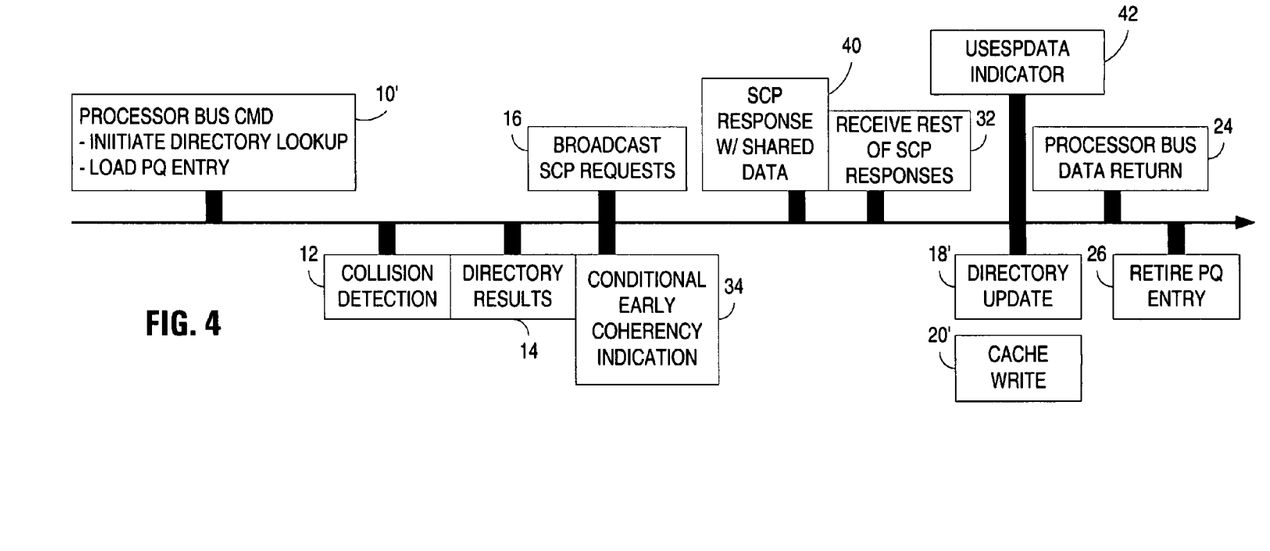
FIG. 4 is a functional timing diagram illustrating the relative timings of various steps in a read exclusive memory transaction in a multinode data processing system implementing a shared memory and utilizing early return indication in a manner consistent with the invention, where the data requested by the read exclusive memory transaction is in a shared state.

FIGS. 3 and 4 next illustrate the processing of a read exclusive request, e.g., a BRIL request, which requests data for the purpose of modifying the data, and thus requires that the requesting node obtain exclusive access to the requested data, with any other copies of the requested data invalidated on the other nodes prior to use of the data by the requesting node. As noted above, it has been found that, when the return data is found to be in an exclusive state on another node, it is suitable to use the return data as soon as it is received from that other node, and without requiring all other nodes to return responses to the requesting node. This is because as a component of processing the request in the remote node, the remote note invalidates its copy of the return data, so the data response acts as a confirmation that no other node in the system has a valid copy of the return data.

As such, as shown in FIG. 3, a read exclusive request is issued in block 10', which results in a directory lookup being initiated and a PQ entry being loaded for the request. Collision detection and the return of directory results occur in a similar manner to that described in the earlier figures in blocks 12 and 14. In addition, in this example the directory results indicate that the request will be sourced by another node, and as such, SCP requests are broadcast as shown in block 16. Then, prior to receiving any responses to the broadcast SCP requests, an indication is provided in block 34, which is referred to herein as a conditional early coherency indication. This indication is conditional from the standpoint that the processor bus interface is not permitted to use the return data unless and until it is known that the return data was in an exclusive state on the node returning the data. For example, as shown in block 36, an SCP response with an indication of exclusive data may be returned, resulting in the processor bus data return occurring shortly thereafter as shown in block 24', even potentially prior to receiving the rest of the SCP responses in block 32.

In contrast, as shown in FIG. 4, if a response is returned that indicates that the data is not exclusively held by any node, e.g., a response with return data indicated to be in a shared state (block 40), the condition for the early coherence indicator is not met, so the node is required to wait for the rest of the SCP responses before indicating that the return data may be used by the processor bus interface in block 24, as a guarantee that no other nodes in the system have valid copies of the requested data. One manner of doing so in the illustrated embodiment is via a separate useSPdata indication, as illustrated in block 42, which may optionally be asserted concurrently with updating the directory and writing to the cache, as shown in blocks 18' and 20'. It will be appreciated that, in systems where only one node is considered to be an owner of any given cache line, only one node may provide the requested data when that data is held in a shared state, whereby the other nodes also holding shared copies of the data may send responses that indicate a shared state, but without the return data appended thereto. As such, the determination that requested data is not in an exclusive state, as illustrated in block 40, may alternatively be made in response to a non-data response that indicates a shared state, and that is received prior to receiving the return data from another node.

Figure 5:
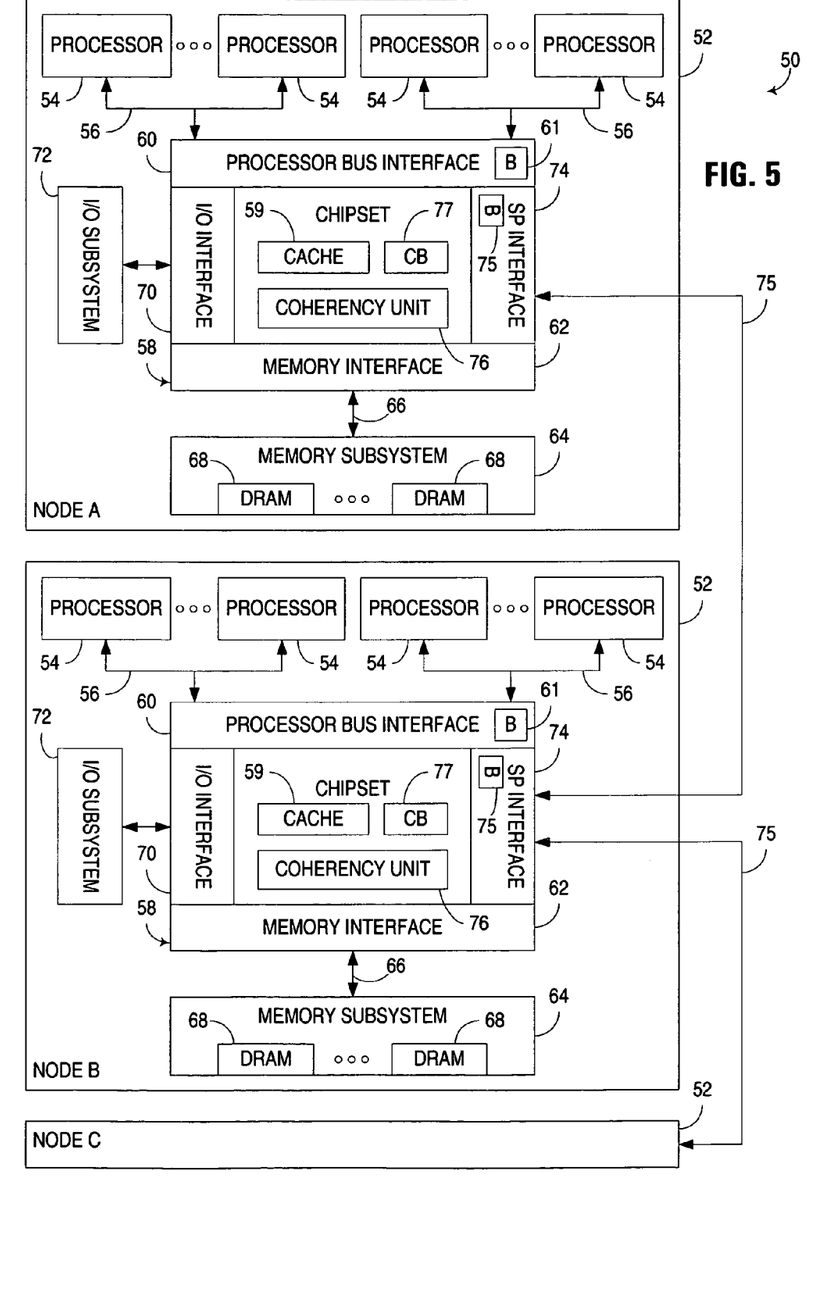
FIG. 5 is a block diagram of a multinode computer system suitable for utilizing early coherency indication in a manner consistent with the invention.

Now turning to FIG. 5, this figure illustrates a multinode computer 50 that represents one suitable environment within which the herein-described early return indication functionality may be implemented in a manner consistent with the invention. Computer 50 generically represents, for example, any of a number of multi-user computers such as a network server, a midrange computer, a mainframe computer, etc. However, it should be appreciated that the invention may be implemented in practically any device capable of utilizing a data bus that serves multiple memory requesters, including other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 50, being implemented as a multinode computer, includes a plurality of nodes 52, each of which generally including one or more processors 54 coupled to one or more system or processor buses 56. Also coupled to each of processor buses 24 is a chipset 58 incorporating a chipset cache 59, a processor bus interface 60, and a memory interface 62, which connects to a memory subsystem 64 over a memory bus 66. Memory subsystem typically includes a plurality of memory devices, e.g., DRAM's 68, which provides the main memory for each node 52.

For connectivity with peripheral and other external devices, chipset 58 also includes an input/output interface 70 providing connectivity to an I/O subsystem 72. Furthermore, to provide internodal connectivity, an internodal interface, e.g., a scalability port interface 74, is provided in each node to couple via a communications link 75 to one or more other nodes 52. Chipset 58 also typically includes a number of buffers resident therein, e.g., a central buffer 77, as well as one or more dedicated buffers 61, 75 respectively disposed in processor bus interface 60 and scalability port interface 74.

Chipset 58 also includes control logic referred to herein as a coherency unit 76 to manage the processing of memory requests provided to the chipset by processors 54 and/or remote nodes 52 over a scalability port interconnect 75. It is within chipset 58 that early return indication is implemented in the embodiment of FIG. 5. Moreover, while other implementations will be envisioned, the embodiment described hereinafter provides early return indication as an optional mode of operation for the chipset, and furthermore, supports early return indication for data being returned in response to requests issued both by processors on the same node (where the data is to be returned over a processor bus) and processors on a different node (where the data is to be returned over the scalability port). Furthermore, in the embodiment discussed hereinafter, it will be appreciated that requests issued to a chipset may be fulfilled by a remote node via the scalability port, via the main memory located on the node, via a cache in the chipset, or in another processor on the local node, depending upon the location of the requested data.

It will be appreciated that multiple ports or interfaces of any given type may be supported in chipset 58. As shown in FIG. 5, for example, it may be desirable to support multiple processor buses (or bus segments) in each node, which, as will be more apparent below, may result in the need to source data requested by a processor on one processor bus by communicating the data from a processor on another processor bus. Furthermore, the various interfaces supported by chipset 58 may implement any number of known protocols. For example, chipset 58 may be compatible with the processor bus protocol for the Xeon line of processors from Intel Corporation. It will be appreciated however that the principles of the invention apply to other computer implementations, including other multinode designs, single node designs, and other designs utilizing split transaction buses and/or protocols.

Chipset 58 may be implemented using one or more integrated circuit devices, and may be used to interface system bus 24 with additional electronic components, e.g., graphics controllers, sound cards, firmware, service processors, etc. It should therefore be appreciated that the term chipset may describe a single integrated circuit chip that implements the functionality described herein, and may even be integrated in whole or in part into another electronic component such as a processor chip.

Computer 50, or any subset of components therein, may be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits that circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to tangible, recordable type media such as volatile and non-volatile memory devices, floppy disks, hard disk drives, CD-ROM's, and DVD's, among others, and transmission type media such as digital and analog communications links.

Figure 6:
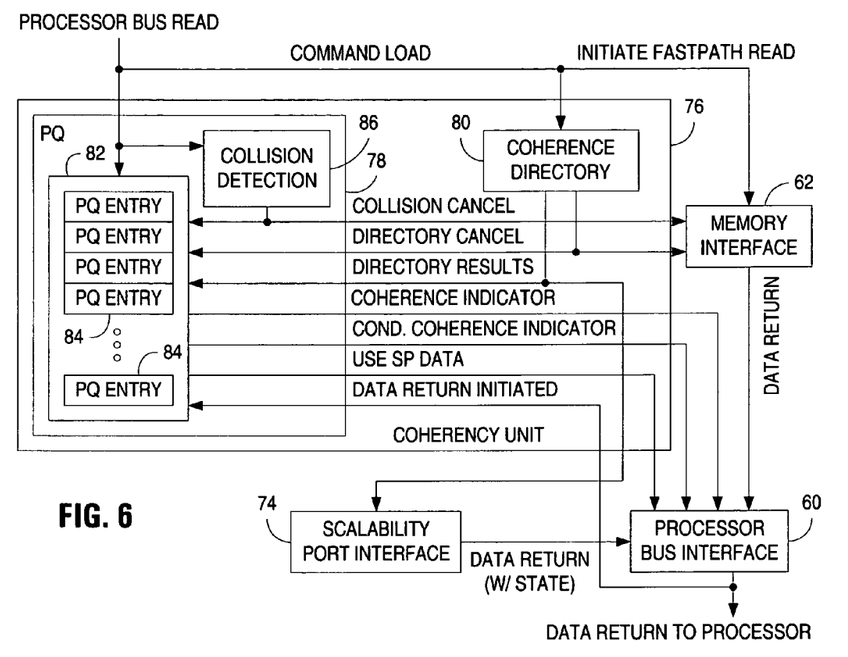
FIG. 6 is a block diagram illustrating the interconnections between the coherency unit, scalability port interface, memory interface and processor bus interface in the chipset of FIG. 5.

FIG. 6 illustrates in greater detail the interconnections between coherency unit 76, memory interface 62, processor bus interface 60 and scalability port interface 74 in chipset 58, specifically with regard to handling processor-initiated memory requests forwarded to the chipset over one of processor buses 56. Coherency unit 76 includes a pending queue 78 and a coherence directory 80.

Pending queue (PQ) 78 includes control logic 82 incorporating an array of PQ entries 84, coupled to a collision detection block 86. Each PQ entry is configured to store status information for a pending command or request being processed by the chipset. Additionally included in each PQ entry utilized in the illustrated embodiment are status fields configured to indicate whether (1) the processor bus interface has been provided with an early coherence indication or a conditional early coherence indication, (2) the scalability port interface has been provided with an early coherence indication, (3) the return data has been forwarded to the processor bus but the coherence directory still needs to be updated, and (4) the return data has been forwarded to the scalability port but the coherence directory still needs to be updated.

Pending queue 78 typically tracks the status of a command or request throughout its lifetime. Typically, this will include receiving the command or request from the processor bus or scalability port interface, determining retry/collision information, receiving directory results to determine where the latest copy of the requested cache line can be found, ensuring that the requested data is obtained by either allowing the fastpath memory read complete, cancelling the fastpath memory read and issuing a new request to another processor bus, or cancelling the memory fastpath request and issuing requests over the scalability port for processor sourced commands, ensuring the data return has occurred, providing notification to the requester that data is available, and ensuring the requestor has consumed the data. Of note, when early return indication is used, the notification provided that data is available is typically performed after receiving the directory results, rather than waiting until after the data return has occurred.

Collision detection block 86 is configured to compare the address or cache line associated with a new request to those of the pending requests stored in the array of PQ entries. Any new request that is directed to the same address or cache line as a pending request is considered to "collide" with the pending request, and will be canceled and retried at a later time. From the perspective of the new request, an indication from the collision detection that no collisions exist is a prerequisite for providing the early return indication. Moreover, from the perspective of a pending request, the fact that later requests that are directed to the same address or cache line will generate collisions ensures that the pending request will not need to be canceled and retried, and as such, the collision detection operates as a guard on the request during the period of time between when the return data for the request is being returned and when the coherence directory is updated as a result of the request. By protecting a pending request in such a manner, it can be assured that a request that will be serviced by the local node, and that does not raise any collisions with other requests, will be able to complete.

Coherence directory 80 stores coherence information related to the associated node, e.g., tracking all cache lines currently cached by local processors, whether those cache lines are owned by this or a different node, and tracking all cache lines owned by this node that have been cached by another node. Based upon the indication of the source of the requested data (e.g., a cache line) for a memory request, the results of the lookup to the coherence directory also operate as a prerequisite on the early return indication, as a memory request that has been requested for an address or cache line that is owned by another node will typically be canceled and retried at a later time.

From the perspective of data flow, FIG. 6 illustrates an incoming processor bus read request that is supplied to each of control logic 82, collision detection block 86, coherence directory 80, and memory interface 60. In the illustrated embodiment, the read request is treated as a speculative request, i.e., a fastpath request, by the memory interface 60, resulting in the memory request being forwarded to the memory subsystem prior to completing any lookup to the coherence directory.

As also seen in FIG. 6, collision detection block 86 and coherency directory 80 are capable of supplying collision and directory cancel signals to each of control logic 82 and memory interface 60, which signals are asserted whenever it is determined that a collision has occurred or the source of the requested data is such that the current memory request must be canceled and retried. Coherence directory 80 also outputs directory results to control logic block 82, which are used to update the PQ entry for the request, as well as to scalability port interface 74, to indicate, when appropriate, that the request will be sourced by a remote node, thus initiating the broadcast of the request to the other nodes over the scalability port interface.

Based upon the aforementioned input signals control logic 82 selectively outputs an early coherence indication when it is known that a given request will complete, and thus, will not need to be retried. This indication is supplied to processor bus interface 60, along with a data return signal generated by memory interface 62 whenever the requested data has become available for those requests that are being handled by the memory of the local node. Based upon these two signals, processor bus interface 60 is able to notify the processor bus interface to initiate transmission of the return data over the processor bus. Furthermore, transfer of the return data to the processor may result in the provision of an indication from the processor bus interface to control logic 82 that the transfer has been initiated.

For those requests being handled by remote nodes, control logic 82 also may utilize the aforementioned early coherence indicator. For handling read exclusive requests, control logic 82 also provides to processor bus interface 60 a conditional early coherence indicator and a useSPdata indicator, described in greater detail below. Furthermore, a direct path between scalability port interface 74 and processor bus interface 60 is provided to enable return data from the scalability port interface to be provided directly to the processor bus interface, and bypassing the central buffer. This data return also provides the state of the return data, which may be encoded, for example, in the header of the return data packet. For read exclusive requests, processor bus interface 60 relies on the conditional coherence indicator and the state of the return data to determine whether the return data can be forwarded to the requesting processor prior to all responses being received from the other nodes in the system.

Figure 7A:
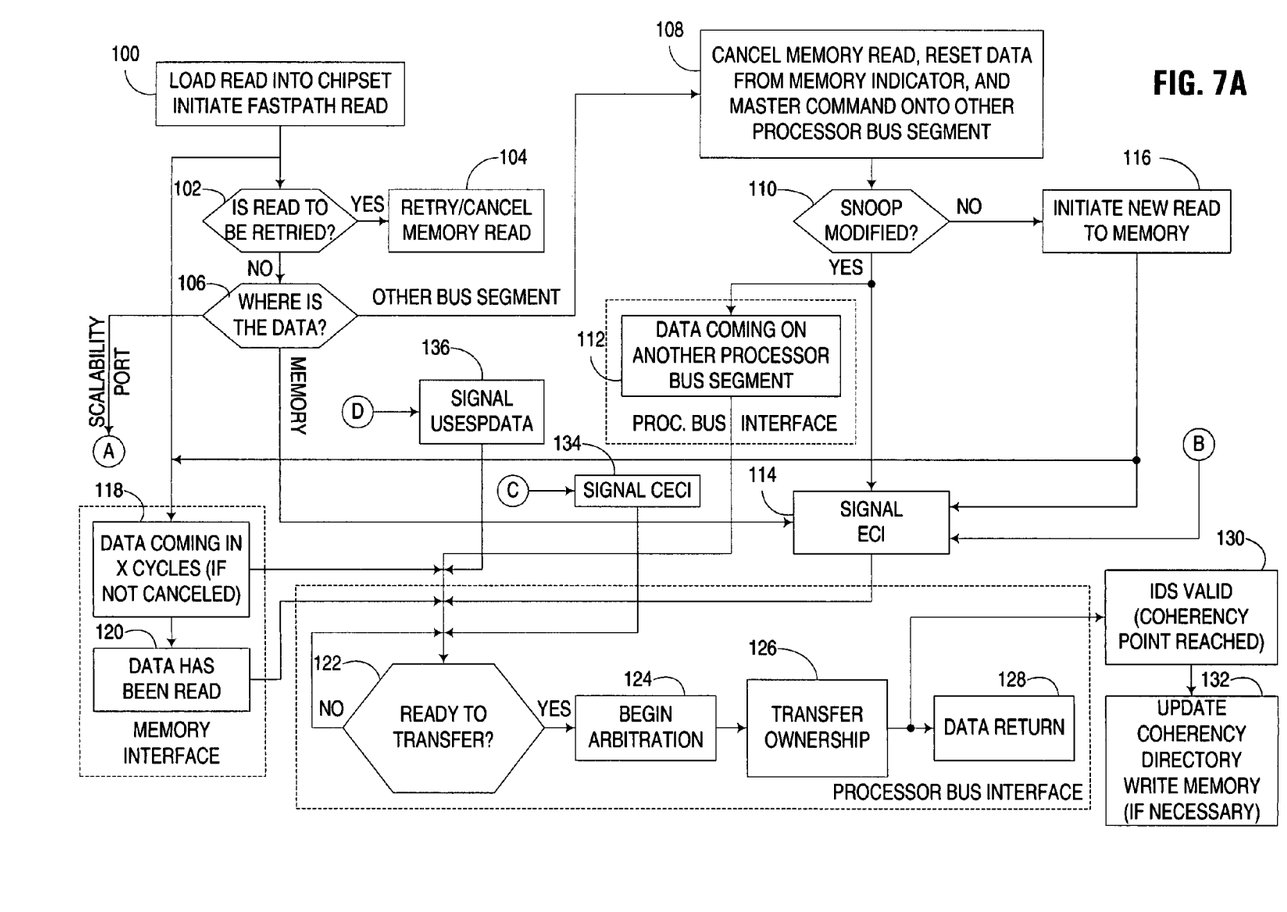
FIGS. 7A-7B are flowcharts illustrating the handling of a processor request in the chipset of FIG. 5.
Figure 7B:
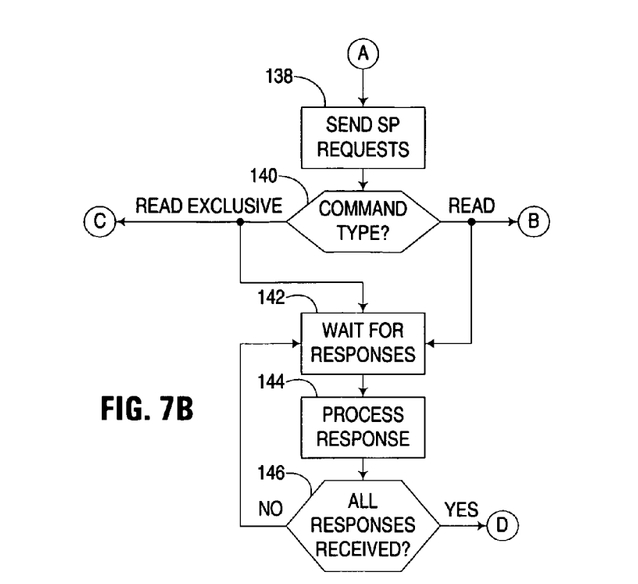

FIGS. 7A-7B next illustrate an exemplary flowchart for handling a processor request in the chipset of FIG. 5. The flowchart illustrates the steps that occur in association with handling a processor request that results in a simple memory fetch, a processor request that results in an intervention by another processor on the other processor bus, and a processor request that results in the issuance of a scalability port request to retrieve the requested data from another node in the data processing system. Moreover, as will become more apparent below, the request may either be a BRL (read) request or a BRIL (read exclusive) request, with the different handling of each in connection with a request that is sourced by another node in the scalability network further illustrated in the figures. It should be noted that in the flowchart of FIGS. 7A-7B, blocks 118 and 120 are implemented by memory interface 62, blocks 112 and 122-128 are implemented by processor bus interface 60, the blocks shown in FIG. 7B (blocks 138-146) are implemented by scalability port interface 74, and the remaining blocks are implemented by control logic 82. The reader may wish to refer to FIG. 6 in association with the discussion of FIGS. 7A-7B.

As shown in block 100, a request is initially loaded into the chipset, which may include initiating a fastpath (speculative) read on the memory interface, whereby at this point, the control logic has a cancel opportunity due to address collisions (detected by collision detector 86), or due to the request being directed to a cache line resident on another node (detected by coherence directory 80). In addition, the control logic may also determine a request needs to be canceled due to buslocks or livelock avoidance. As such, block 102 determines whether the request will be retried (i.e., will not complete). If so, control passes to block 104, whereby the request is canceled and the command is retried back to the source. Handling of the request is then complete.

Otherwise, control passes to block 106 to determine from the coherency directory the source of the requested data. Assuming a scenario where the source of the requested data is the local memory for the node, control passes to block 114 to signal an early coherence indicator (ECI), indicating to the processor bus interface that the data to be returned from memory can be used when it becomes available.

From the perspective of the memory interface, initiation of the fastpath read in block 100 initiates an indication from block 118 to the processor bus interface that data will be arriving to the chipset from the memory subsystem in a fixed (X) number of cycles (assuming the request is not canceled). The indication is typically asserted when the memory interface issues the command on the memory bus. Thereafter, in block 120, once the data does arrive at the chipset, another indication is provided by the memory interface to the processor bus interface.

Turning now to block 122, which is performed by the processor bus interface, the processor bus interface waits on the indications from the control logic and the memory interface to determine when the bus is ready to transfer the requested data. In the case of a request sourced by local memory for the node, block 122 waits until both the ECI is asserted and either of the indications from blocks 118 and 120 is also asserted. Block 122 is also dependent upon a memory reset not occurring (e.g., as may be set in block 108 when a memory read is canceled), which notifies the processor bus interface to ignore any data already seen for the request and start looking for new data (e.g., if data is returned prior to receiving directory results that indicate the requested data should not be sourced from the local memory). Of note, block 122 may wait until a different (e.g., shorter) number (Y) of cycles than X cycles remain until the data will arrive from the memory interface. Once these conditions are met, block 122 passes control to block 124 to begin arbitration for the processor bus at an appropriate amount of cycles before the data will arrive (which is computed based upon the bus protocol) to initiate the data return. It should also be appreciated that, during this time, the control logic will hold off any subsequent requests that collide with the request.

Next, control passes to block 126 to transfer ownership of the requested data (typically the cache line with which the data is associated) from the chipset to the requesting processor. For example, depending upon the protocol supported, the transfer may be performed during a deferred snoop phase or during an IDS (identification strobe) phase, or in another manner suitable for the particular protocol. Next, as illustrated in block 128, as data is returned from memory, the data typically flows into a central data buffer in the chipset, and optionally directly into a buffer in the processor bus interface as well, to preserve the data in case the processor interface buffers are full. Due to the early arbitration allowed by the early coherence indicator, the processor bus interface is able to take the data and drive it out on the processor bus with minimal buffering.

Also, as shown in block 130, as data is returned to the source processor over the processor bus, the processor bus interface provides an IDS valid notification to the control logic that the transfer of ownership for the requested data has occurred, and that the directory state should now be updated in the coherency directory. Block 132 then updates the coherency directory, and writes the cache line to the local cache if necessary. Processing of the request is then complete.

Returning now to block 106, assuming a scenario where the source of the requested data is a processor on another processor bus (or bus segment) in the node, control instead passes to block 108 to cancel the memory read and reset an indicator that indicates that the data will be coming from memory. In addition, block 108 masters a command onto the appropriate processor bus to initiate the retrieval of the return data from the appropriate processor within which the return data resides.

Upon mastering the command on the other bus, a snoop will be performed by the processors on the bus to obtain the state of the requested cache line. If the cache line is in any other state than modified, block 110 passes control to block 116 to simply initiate a new read to the memory, as the exemplary embodiment is configured to implement modified intervention, where a processor only intervenes when that processor has the cache line in a modified state. It will be appreciated that other intervention protocols may be supported in other embodiments.

Upon completion of block 116, control passes to block 114 to assert the ECI, as well as to initiate the read on the memory bus via block 118. The memory request will then be handled in the basic manner described above for a request initially determined to be sourced by the memory.

Returning to block 110, if it is determined that a processor has a modified copy of the cache line, control is passed to block 114 to signal the ECI. Moreover, as illustrated in block 112, the processor bus interface provides a data indicator to the processor bus for the requesting processor that data will be arriving in a fixed number of cycles. Block 122 thereafter initiates the data return once receiving the ECI and the indication from the other processor bus, and processing of the request proceeds in a similar manner as for a request sourced by memory, but with the other processor bus providing the return data to the central data buffer, and optionally the requesting processor bus interface buffer. Also, as with a request sourced by memory, due to the early arbitration allowed by the early coherence indicator, the processor bus interface is able to take the data and drive it out on the requesting processor bus with minimal buffering.

Returning again to block 106, assuming a scenario where the source of the requested data is a processor or memory on another node, control instead passes to block 138 (FIG. 7B) to broadcast the SP requests to the other nodes over the scalability port interface. Next, block 140 determines whether the request is a read request (BRL) or a read-exclusive request (BRIL). If a read request, the ECI signal is asserted in block 114, and if a read exclusive request, a Conditional Early Coherence Indicator (CECI) signal is asserted in block 134 (FIG. 7A). Returning to FIG. 7B, irrespective of the type of request, control passes to block 142 to wait for the responses to the SCP requests from the other nodes. Each received response is processed in block 144 (e.g., by tracking receipt of the response), and block 146 returns control to block 142 to wait for the other responses until all responses have been received. Once all such responses have been received, block 146 passes control to block 136 (FIG. 7A) to assert the useSPdata signal, such that in the event the processor bus interface receives shared data in response to a read-exclusive request, the interface can be notified when all responses are received.

Figure 8:
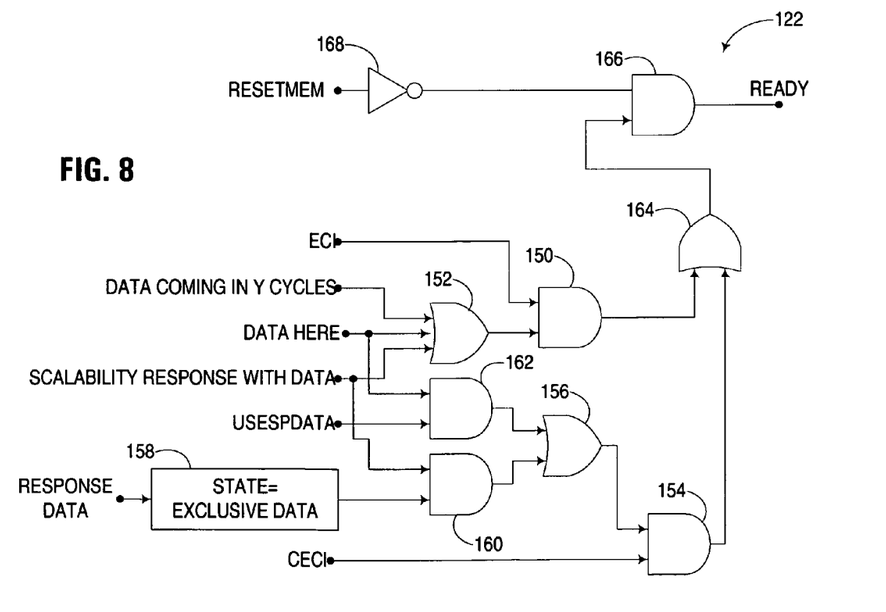
FIG. 8 is a block diagram of an exemplary implementation of the ready to transfer block referenced in FIG. 7A.

FIG. 8 illustrates one exemplary implementation of block 122 to process early return indications in a manner consistent with the invention. FIG. 8 in particular illustrates an exemplary logic diagram including blocks 150-168.

For requests sourced either locally on a node, or for read requests sourced by a different node, the ECI signal is coupled to AND gate 150, having another input coupled to the output of an OR gate 152. Gate 152 receives as input the data coming in y cycles and data here signals output by blocks 118 and 120 (FIG. 7A), and a scalability response with data signal, which is asserted whenever response data is received from the scalability port interface by the processor bus interface.

For read exclusive requests sourced by another node, the CECI signal is coupled to AND gate 154, having another input coupled to the output of an OR gate 156. A test block 158 determines from the response data (e.g., via the header of the response packet) whether the state of the data is exclusive, and outputs a signal indicating the same. This output is provided to an AND gate 160, which also receives the indication that a scalability response with data has been received, such that the output of AND gate 160, which is provided to OR gate 156, is asserted whenever an exclusive data response is received by the scalability port interface.

The other input of OR gate 156 is coupled to an AND gate 162, which combines the data here signal (generated by block 120) and the useSPdata signal (generated by block 136) to indicate when the data has arrived from the scalability port and all responses have been received.

The outputs of AND gates 150 and 154 are combined by OR gate 164, which outputs to an AND gate 166 having as its other input the output of an inverter 168 that receives the memory reset signal (generated by block 108). The output of gate 166 is a ready signal that is asserted whenever the processor bus interface is ready to begin arbitrating for return of data over the processor bus.

Early return indication in a manner consistent with the invention therefore minimizes latency, and potentially minimizes buffering requirements, whenever it can be determined that data returned from a particular source in response to a request can be used prior to receiving responses from all other sources that receive the request.

Early return indication may also provide a number of additional benefits consistent with the invention. For example, when the data is being returned from memory, the data may be allowed to flow into the processor bus interface buffer without being ECC corrected. If no ECC error or correction occurs the data is correct as soon as it is received, and can be driven directly to the requester. If an ECC error or correction occurs, a signal may still be sent from the memory interface to the processor bus interface to enable the processor bus interface to stall the data return for one or more cycles, as required to receive the corrected data.

In addition, when the data is being returned over a processor bus, the "data coming" indication may be provided based upon a data transfer signal such as the TRDY signal used in the Intel Xeon bus protocol. A minimum architected time may be specified from the TRDY signal to data on the processor bus; however, it may be desirable to allow the processor to take longer than the minimum time to supply the data. In the case where the data does not arrive according to minimum timings, it may be desirable to discard the packet and then restart the packet at a later time when the data is known to be in the central buffer (if being routed to the scalability port interface), or to stall the data return for one or more cycles (if being routed to the processor bus interface).

Therefore, it will be appreciated that the provision of an early return indication reduces the latency of read requests, and enables coherence directory updates and response tracking to be removed from the critical path for processing such read requests. It will be appreciated that various additional modifications may be made to the illustrated embodiments consistent with the invention. It will also be appreciated that implementation of the functionality described above within logic circuitry disposed in a chipset or other appropriate integrated circuit device, would be well within the abilities of one of ordinary skill in the art having the benefit of the instant disclosure.

What is claimed is:

1. A method of processing a request for data in a data processing system of the type including a first communications interface configured to be coupled to at least one requester over a first communications link and a second communications interface configured to be coupled to a plurality of sources over a second communications link, the method comprising, in response to a request by the requester:

forwarding the request to the plurality of sources over the second communications interface;

tracking responses to the request from each of the plurality of sources; and prior to receiving a response from any of the plurality of sources, indicating to the first communications interface that return data received from one of the sources in response to the request can be used by the first communications interface if the source has an exclusive copy of the return data.

2. The method of claim 1, further comprising:

accessing coherency information stored in a coherency directory to identify the source of return data for the request; and updating the coherency directory based upon the request;

wherein indicating to the first communications interface that the return data can be used by the first communications interface is performed prior to updating the coherency directory.

3. The method of claim 1, wherein the first communications interface comprises a processor bus interface configured to be coupled to at least one processor over a processor bus, wherein the request is generated by the processor and received by the processor bus interface, wherein the first and second communications interfaces and the control logic are disposed in a first node in a multi-node data processing system, and wherein the second communications interface comprises an internodal interface configured to coupled the first node to a second node.

4. The method of claim 1, further comprising, in the first communications interface, preparing for communication of the return data over the communications link in response to the indication, and prior to the return data being available to the communications interface, by arbitrating for the communications link to line up the return data.

5. The method of claim 1, wherein the indication to the communications interface comprises a conditional early coherence indicator.

6. The method of claim 1, further comprising, in the first communications interface, after the indication is made that return data received from one of the sources in response to the request can be used by the first communications interface if the source has an exclusive copy of the return data, determining whether the return data received from the source indicates that the source has an exclusive copy of the return data.

7. The method of claim 1, further comprising, in the first communications interface, initiating communication of the return data over the first communications link when received thereby from the source of the return data over the second communications interface prior to responses being received from all of the plurality of sources if a determination is made that the source has an exclusive copy of the return data.

8. The method of claim 7, further comprising waiting until responses have been received from all sources if a determination is made that the source does not have an exclusive copy of the return data.

* * * * *